United States Patent
Numata et al.

(10) Patent No.: US 10,816,463 B1
(45) Date of Patent: Oct. 27, 2020

(54) FAST AND WIDELY TUNABLE MONOLITHIC OPTICAL PARAMETRIC OSCILLATOR FOR LASER SPECTROMETER

(71) Applicant: United States of America as represented by the Administrator of NASA, Washington, DC (US)

(72) Inventors: Kenji Numata, College Park, MD (US); Haris Riris, Arlington, VA (US); Stewart T. Wu, Ellicott City, MD (US); Xiaoli Sun, Bethesda, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 173 days.

(21) Appl. No.: 16/059,850

(22) Filed: Aug. 9, 2018

(51) Int. Cl.
  *G01N 21/39* (2006.01)
  *G01N 21/3504* (2014.01)
  *G01N 21/27* (2006.01)

(52) U.S. Cl.
  CPC .......... *G01N 21/39* (2013.01); *G01N 21/27* (2013.01); *G01N 21/3504* (2013.01)

(58) Field of Classification Search
  CPC ..... G01N 21/39; G01N 21/27; G01N 21/3504
  See application file for complete search history.

(56) References Cited

U.S. PATENT DOCUMENTS

| | | | | |
|---|---|---|---|---|
| 6,359,914 B1* | 3/2002 | Powers | ..................... | G02F 1/39 372/20 |
| 6,501,597 B1* | 12/2002 | Pitt | ..................... | H01S 3/06775 359/333 |
| 2002/0018504 A1* | 2/2002 | Coldren | ................. | G01N 21/41 372/50.21 |
| 2002/0071122 A1* | 6/2002 | Kulp | ...................... | G01M 3/38 356/437 |
| 2003/0007205 A1* | 1/2003 | Lee | ........................ | H04B 10/00 398/5 |
| 2004/0095579 A1* | 5/2004 | Bisson | ............... | G01N 21/1702 356/432 |
| 2009/0323172 A1* | 12/2009 | Furuya | ................. | G02F 1/3551 359/326 |
| 2010/0321766 A1* | 12/2010 | Yoshino | ................ | G02B 6/262 359/328 |
| 2011/0128538 A1* | 6/2011 | Cerullo | ..................... | G01J 3/44 356/301 |

(Continued)

OTHER PUBLICATIONS

Dirk Richter, David G. Lancaster, and Frank K. Tittel, "Development of an automated diode-laser-based multicomponent gas sensor," Appl. Opt. 39, 4444-4450 (2000) (Year: 2000).*

(Continued)

*Primary Examiner* — Dominic J Bologna
(74) *Attorney, Agent, or Firm* — Christopher O. Edwards; Bryan A. Geurts; Helen M. Galus

(57) ABSTRACT

A laser spectrometer includes a tunable laser assembly, a periodically-poled nonlinear optical crystal, with parallel polished input and output end faces, and a mechanism for controlling an entrance location of a pump input beam of the tunable laser on the input end face of the periodically-poled nonlinear optical crystal, such that the pump input beam traverses different grating periods of the periodically-poled nonlinear optical crystal.

11 Claims, 8 Drawing Sheets

(56) References Cited

U.S. PATENT DOCUMENTS

2012/0020378 A1* 1/2012 Li .............................. G02F 1/39
372/10

OTHER PUBLICATIONS

K. Fujiura and K. Nakamura, "KTN crystal with a large electro-optic effect and the potential for improving optical device performance," 2004 IEEE International Topical Meeting on Microwave Photonics (IEEE Cat. No. 04EX859), Ogunquit, ME, 2004, pp. 3-. (Year: 2004).*

* cited by examiner

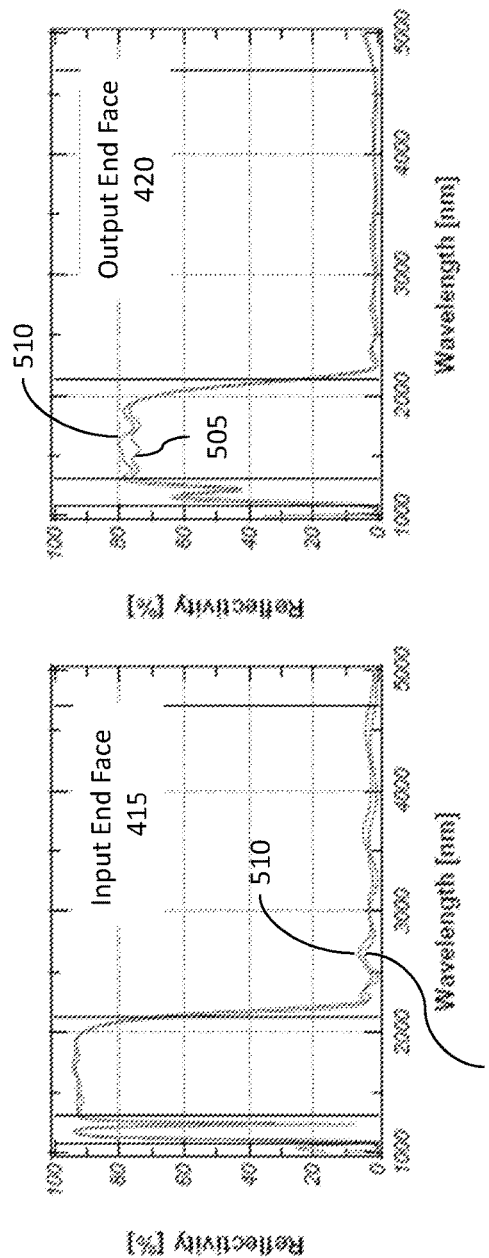
FIG. 5A
FIG. 5B
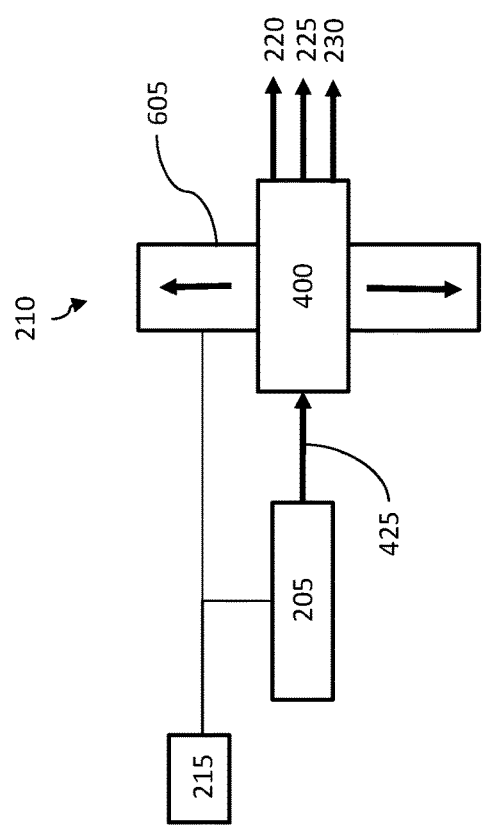
FIG. 6

FAST AND WIDELY TUNABLE MONOLITHIC OPTICAL PARAMETRIC OSCILLATOR FOR LASER SPECTROMETER

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

In remote sensing laser spectrometers, wavelength-scanned laser emissions are used to capture the absorption spectrum of target species to perform spectroscopic measurements of remote planetary surfaces or gasses. The wavelengths of the lasers must cover the absorption spectrum of the target feature to estimate the abundance of the target material (e.g. ice on the moon). For example, in order to generate laser radiation in the 2~5 µm region, where many molecules of interest have absorption lines, an optical parametric oscillator pumped by 1 µm laser has been commonly used because traditional solid state lasers are incapable of generating high energy pulses.

When wide wavelength tuning is required, remote spectroscopy instruments have been realized by combining multiple fixed-wavelength lasers to provide a relatively narrow range of wavelengths for detecting a specific species. For example, a lunar ice reflectance spectrometer for future missions is presently limited to a number of fixed laser wavelengths, typically 4 to 6, where each wavelength is generated by a discrete optical parametric oscillator laser, where the 4 to 6 wavelengths are externally combined to generate a wavelength stepped pulse train to scan over a wide wavelength band. FIG. 1 shows a schematic diagram of a typical prior art remote spectroscopy instrument 100. The instrument includes a number of laser light sources $105_1$-$105_n$, each coupled to a discrete optical parametric oscillator $110_1$-$110n$, made up of a crystal with external mirrors. Multiple detectors $115_1$-$115_n$ are generally required in order to control the laser light source outputs, and a beam expander 120 is typically required for remote planetary applications. Generally, the use of multiple laser, discrete optical parametric oscillator, and detector combinations, along with the associated support components and power supplies, results in high Size, Weight, and Power (SWaP) characteristics, and only a single species may be measured by such instruments due to their limited tuning capability. Furthermore, the operation of the optical parametric oscillators is complicated, primarily because of the use of multiple mirrors to form an optical cavity around a nonlinear crystal. Angle tuning of nonlinear crystals has also been used as a way to tune the optical parametric oscillators' output wavelength, however, the tuning range is generally narrower and the three waves involved (pump, signal, and idler) do not propagate collinearly with each other, making it difficult to use the optical parametric oscillator source for remote sensing applications.

Widely-tunable optical parametric amplifiers that do not require cavity mirrors around the non-linear crystal have also been utilized. However, the output of an optical parametric amplifier has a wide line width that is not usually suited for spectroscopic applications. In addition, the efficiency of an optical parametric amplifier is usually lower than that of an optical parametric oscillator, and is not suited for space applications where efficiency is an important consideration.

Passive spectrometers that use sunlight may also be used for remote analysis but, while they may measure multiple species because their wavelength coverage is wide, their spatial resolution is very low because the sun as a light source is large. In addition, such a detection technique is ineffective on surfaces that face away from the sun and lack the required illumination.

SUMMARY

The disclosed embodiments are directed to a laser spectrometer, having a tunable laser assembly, a periodically-poled nonlinear optical crystal, with parallel polished input and output end faces, and a mechanism for controlling an entrance location of a pump input beam of the tunable laser on the input end face of the periodically-poled nonlinear optical crystal, such that the pump input beam traverses different grating periods of the periodically-poled nonlinear optical crystal.

The periodically-poled nonlinear optical crystal may include a MgO:PPLN: magnesium oxide doped, periodically-poled lithium niobate crystal.

The periodically-poled nonlinear optical crystal may include a linearly changing polling period along a width of the periodically-poled nonlinear optical crystal.

The linearly changing polling period may extend from approximately 26.5 µm on a first longitudinal side to approximately 31.5 µm on a second longitudinal side.

The input end face may have an approximate transmission of >95% for both the pump input beam and for an idler beam, and an approximate reflectivity of >90% for a signal beam.

The output end face may have an approximate transmission of >95% for both the pump input beam and for an idler beam, and an approximate reflectivity of 76% for a signal beam.

The mechanism may include a movable stage on which the crystal is mounted.

The mechanism may include an optical deflector.

The optical deflector may include a potassium tantalate niobate crystal.

The tunable laser assembly may include a seed laser, a pump laser, a pump combiner, and a gain fiber.

The seed laser may include a semiconductor laser with a tunable phase section and multiple grating sections.

The seed laser may be a sampled-grating distributed Bragg reflector laser.

BRIEF DESCRIPTION OF THE DRAWINGS

The foregoing aspects and other features of the embodiments are explained in the following description, taken in connection with the accompanying drawings, wherein:

FIGS. 5A and 5B show design and production reflectivity characteristics of end faces of the crystal;

FIG. 6 shows a controller, a tunable laser assembly, and a crystal assembly according to the disclosed embodiments;

DETAILED DESCRIPTION

Figure 1:
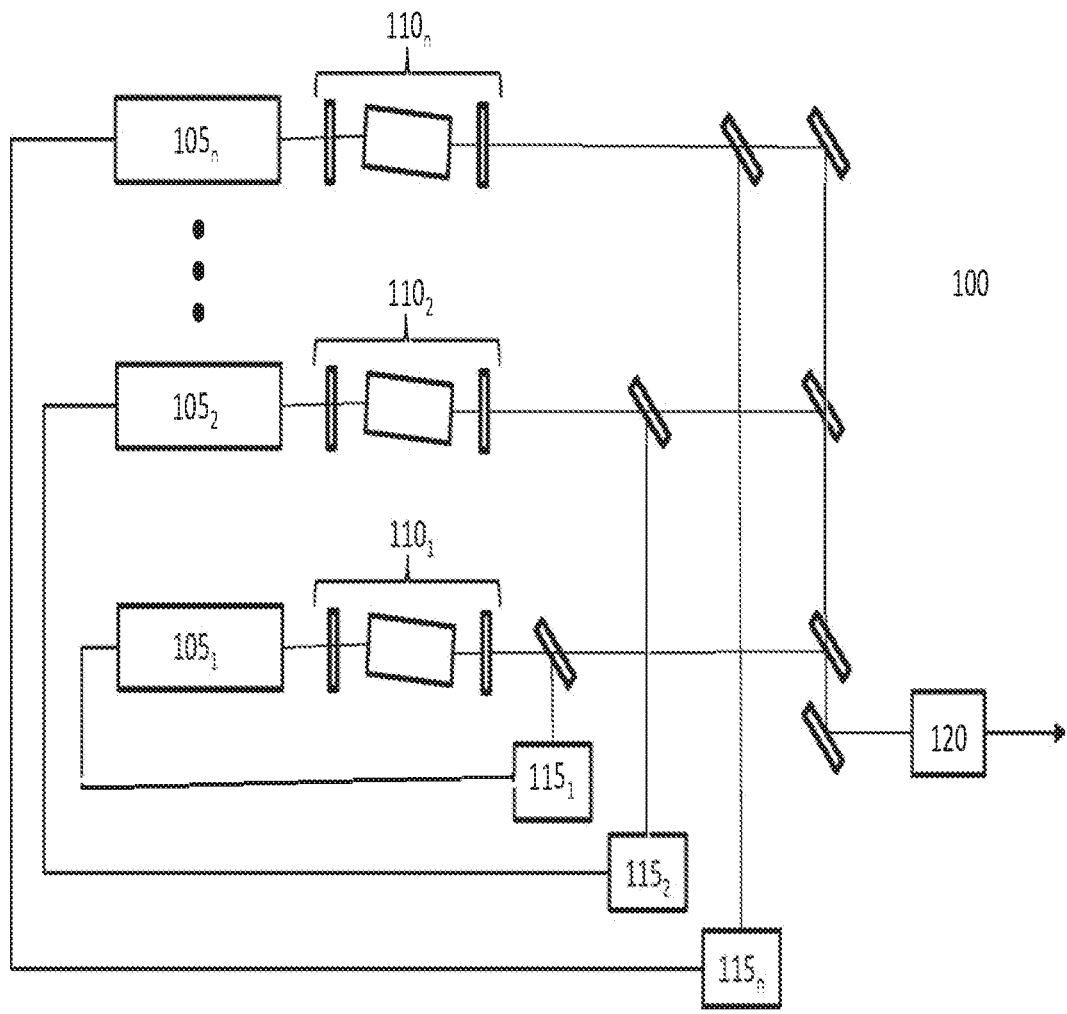
FIG. 1 illustrates an example of a prior art laser remote spectroscopy instrument.

Although the disclosed embodiments will be described with reference to the embodiments shown in the drawings and described below, it should be understood that these could be embodied in many alternate forms. In addition, any suitable size, shape or type of elements or materials could be used.

The disclosed embodiments generally relate to providing a laser spectrometer with a continuously tunable optical parametric oscillator. The disclosed laser spectrometer may be used in Light Detection and Ranging (LIDAR) applications, in particular when illuminating a target with pulsed laser light and analyzing the reflected pulses for measuring specific species.

The disclosed embodiments are directed to a less complicated and more flexible laser spectrometer that utilizes a parallel polished, non-linear crystal without optical cavity mirrors and their associated components, that provides multiple tuning options for different applications. The crystal itself forms an optical cavity, and provides various wavelength outputs depending on where a pump laser enters the crystal. The pump laser entry location may be changed by laterally shifting the nonlinear crystal or by electro-optically shifting the pump laser output. The pump laser may be a fast-tunable laser, and by changing the pump laser wavelength, the phase matching condition in the crystal can be dynamically changed, and the output wavelength can be tuned across wavelengths suitable for spectroscopic measurements of remote planetary surfaces or gasses.

Figure 2:
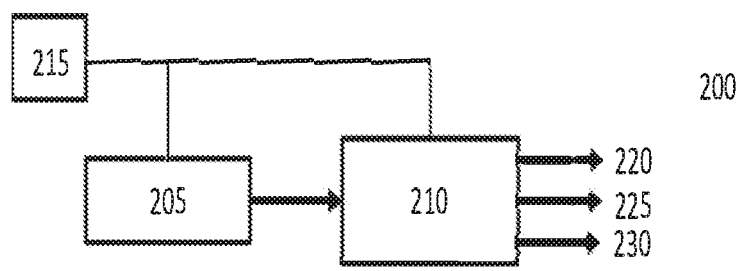
FIG. 2 shows a schematic diagram of an exemplary laser spectrometer according to the disclosed embodiments.

FIG. 2 shows a schematic diagram of the basic components of an exemplary monolithic optical parametric oscillator laser spectrometer 200 according to the disclosed embodiments. The laser spectrometer 200 includes a tunable laser assembly 205, a crystal assembly 210, and a controller 215. A quasi-phase matching process inside a parallel polished crystal of the crystal assembly 210 may generate co-aligned pump 220, idler 225, and signal 230 beams. The tunable laser assembly 205 may be pulsed for remote sensing applications, and may be configured to implement various tuning methods and line width control methods as explained below.

Figure 3:
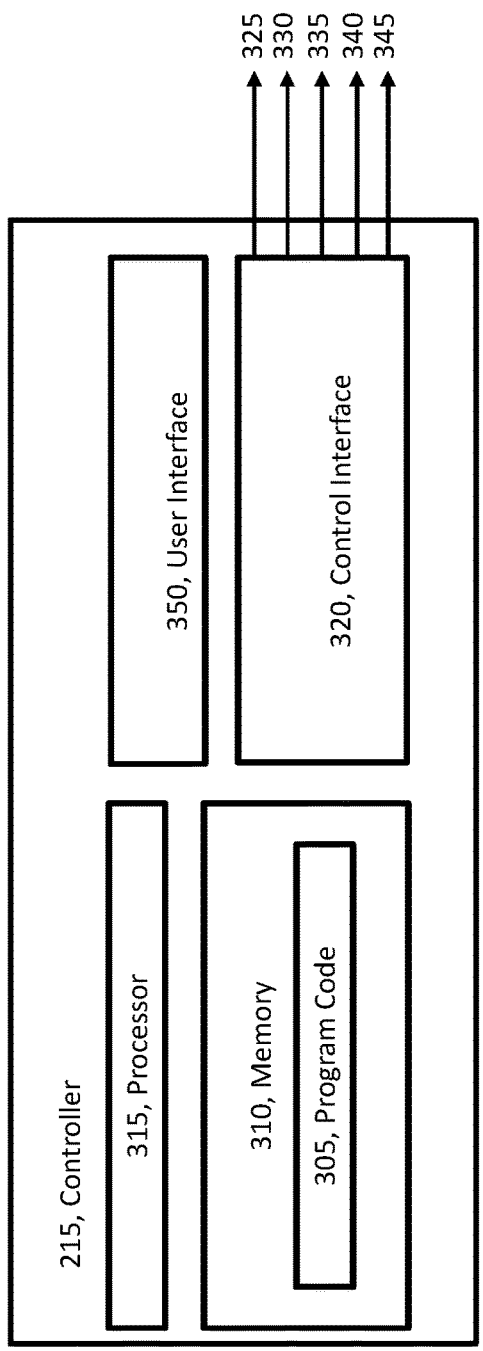
FIG. 3 shows a schematic block diagram of a controller for the exemplary laser spectrometer of the disclosed embodiments.

A schematic block diagram of an exemplary controller 215 is shown in FIG. 3. The controller 215 generally includes computer readable program code 305 stored on at least one computer readable medium for carrying out and executing the process steps described herein. The computer readable medium may be a memory 310 of the controller 215. In alternate aspects, the computer readable program code may be stored in a memory external to, or remote from, the controller 215. The memory 310 may include magnetic media, semiconductor media, optical media, or any media which is readable and executable by a computer.

The controller 215 may also include a processor 315 for executing the computer readable program code 305. In at least one aspect, the controller 215 may include one or more input or output devices, including a control interface 320 that provides signals 325 for exchanging information with and for controlling the tunable laser assembly 205, signals 330 for exchanging information with and for controlling the crystal assembly 210, and signals 335, 340, 345 for exchanging information with and for controlling other components of the monolithic optical parametric oscillator laser spectrometer 200. The controller 215 may also include a user interface 350 for exchanging information and commands with a user.

Figure 4:
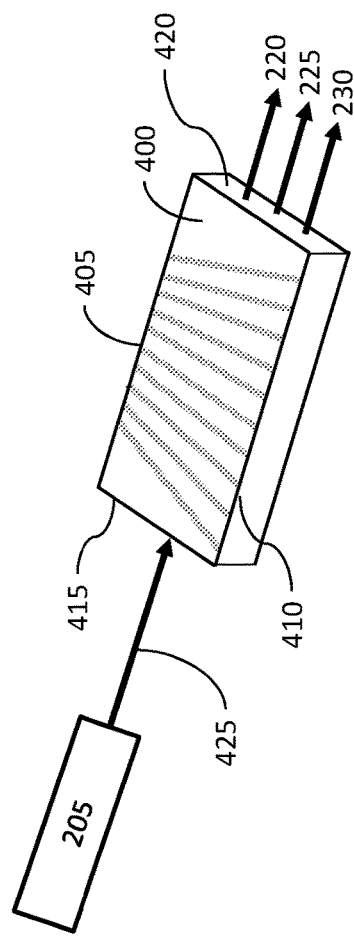
FIG. 4 shows a schematic diagram of a parallel polished crystal according to the disclosed embodiments.

A schematic view of the parallel polished crystal 400 of the disclosed embodiments is shown in FIG. 4. The parallel polished crystal 400 may be a periodically-poled nonlinear optical crystal and may comprise, for example, MgO:PPLN: magnesium oxide doped, periodically-poled lithium niobate. The crystal 400 may have exemplary dimensions of 35 mm×16 mm×1 mm, but it should be understood that any dimensions suitable for implementing the disclosed embodiments may be utilized. The polling period may be linearly changed along the crystal width, for example, from approximately 26.5 μm on a first longitudinal side 405 to approximately 31.5 μm on a second longitudinal side 410, with a fan out of approximately 9 degrees at the second side 410. Other polling configurations may also be utilized in order to realize the disclosed embodiments. The parallel polished crystal 400 may have an input end face 415, and an output end face 420. Instead of the external mirrors used in conventional applications, the end faces 415, 420 are parallel-polished to form an optical etalon, such as a Fabry-Perot cavity. Polishing a 16 mm×1 mm end face of a lithium niobate crystal may present difficulties because of the dimensions and materials, however, using an interferometer with a 632 nm laser for measurement, parallelism within 5-9 fringes can be achieved.

As mentioned above, a quasi-phase matching process inside the crystal 400 may generate co-aligned pump 220, signal 225 (e.g. approximately 1380~2128 nm) and idler 230 (e.g. approximately 2128~4600 nm) output beams, when pumped by a pump input beam 425 (e.g. from a fiber amplifier at 1064 nm). In at least one operational mode, the tunable laser assembly 205 is aligned so that the pump input beam 425 is perpendicularly aligned to the parallel polished crystal's end faces 415, 420 to cause optical parametric oscillation. The parallel polished crystal 400 may be operated as a singly-resonant optical parametric oscillator, where only the signal beam is resonant in the monolithic cavity formed by the end faces 415, 420 of the parallel polished crystal 400.

In some embodiments, the end faces 415, 420 of the parallel polished crystal 400 may be coated to implement a doubly-resonant optical parametric oscillator, or a triply-resonant optical parametric oscillator. The wideband coating on the high refractive index material (MgO: PPLN) may be a silicon oxide based coating. In at least one embodiment, the input end face 415 may have a high transmission T, for example, T>95%, for the pump beam at approximately 1064 nm, and the idler beam at approximately 2100~4700 nm, and may have a high reflection R, for example, approximately R>90% for the signal beam at approximately 1480~2128 nm. The output end face 420 may have a high transmission T, for example, T>95%, for the pump and idler beams, and a low reflection R, for example, approximately R-76%, for the signal beam, and thus may operate as an output coupler. FIGS. 5A and 5B show the design 505 and actual production 510 reflectivity characteristics for the input end face 415 and the output end face 420, respectively.

Various tuning methods and output linewidth control configurations and methods may be utilized, individually or in different combinations to achieve multiple tuning options for different applications.

An exemplary embodiment shown in FIG. 6 includes the controller 215, the tunable laser assembly 205, and the crystal assembly 210 comprising the parallel polished crystal 400. One or more of the disclosed embodiments includes a mechanism for controlling an entrance location of the pump input beam 425 on the input end face 415 of the crystal 400 such that the pump input beam 425 traverses different grating periods of the crystal 400. For example, the parallel polished crystal 400 may be mounted on a movable stage 605. The movable stage 505 may be motorized and, under control of the controller 215, may shift the parallel polished crystal 400 laterally, that is, in a direction perpendicular to the pump input beam 425. While the movable stage 605 is shown proximate the parallel polished crystal 400, it should be understood that the movable stage 605 may be situated in any suitable location. The parallel polished crystal 400 may be laterally shifted using the movable stage 605 such that the pump input beam 425 traverses different grating periods caused by the changes in the polling period along the crystal width, while the pump input beam 425 is spatially fixed. Using this configuration, the pump 220, idler 225, and signal 230 output beams can be smoothly and continuously tuned across a range of frequencies without losing alignment between the pump input beam 425 and the parallel polished crystal 400.

Figure 7:
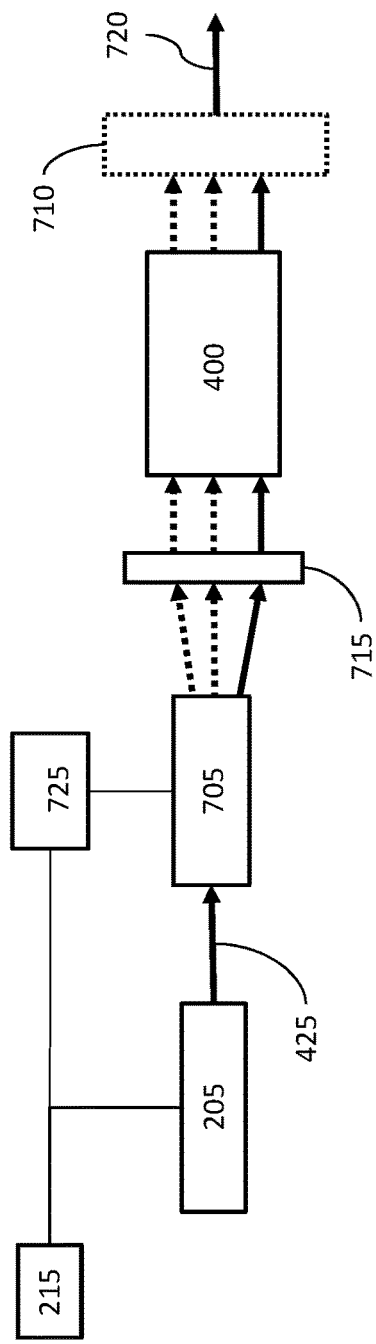
FIG. 7 shows an exemplary tuning configuration according to the disclosed embodiments.

FIG. 7 shows another exemplary tuning configuration including the controller 215, the tunable laser assembly 205, the parallel polished crystal 400, an optical deflector 705, a lens 715 and an optional beam combiner 710. In at least one embodiment, the optical deflector 705 may be implemented using a potassium tantalate niobate (KTN) crystal, in which a change in refractive index is caused by an applied electric field. The electric field may be supplied by a power supply 725 controlled by the controller 215. The KTN crystal deflects the pump input beam and thus changes the entrance point on the parallel polished crystal 400. As a result, the deflected beam 715 traverses different grating periods caused by the changes in the polling period along the parallel polished crystal width. The deflection process is relatively fast because it results from an electrical phenomenon of the KTN crystal. In some embodiments, for example, tuning over 1000 nm/usec may be achieved. However, the intermediate output beam location is also shifted accordingly in this tuning mode, and a lens 715 can be used to ensure the beams entering the parallel polished crystal 400 are parallel and perpendicular to input end face of the parallel polished crystal. The optional beam combiner 710 may be used depending on the application to produce a consolidated output beam 720.

Figure 8:
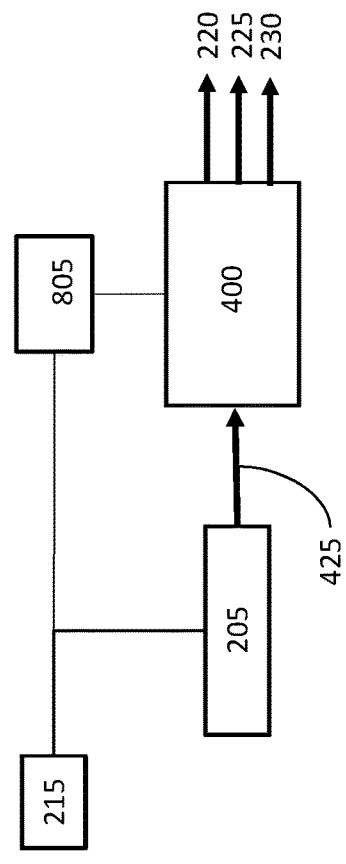
FIG. 8 shows another exemplary tuning configuration according to the disclosed embodiments.

FIG. 8 shows another exemplary tuning configuration including the controller, the tunable laser assembly 205, and the parallel polished crystal 400. According to the disclosed embodiments, the refractive index of the MgO:PPLN: magnesium oxide doped, periodically-poled lithium niobate crystal 400 may also be changed by applying an electric field, which may be provided by a power supply 805, controlled by the controller 215. In some embodiments, this may allow further spectral tuning of approximately 1 nm for every kilovolt provided by the power supply 805.

FIGS. 6 through 8 illustrate unseeded laser configurations which may be capable of achieving linewidths in the range of 1-10 nm. These linewidths may be advantageous for resolving wide spectral structures, for example, in the range of 1000 nm, such as detecting ice on remote planetary surfaces such as the moon.

Figure 9:
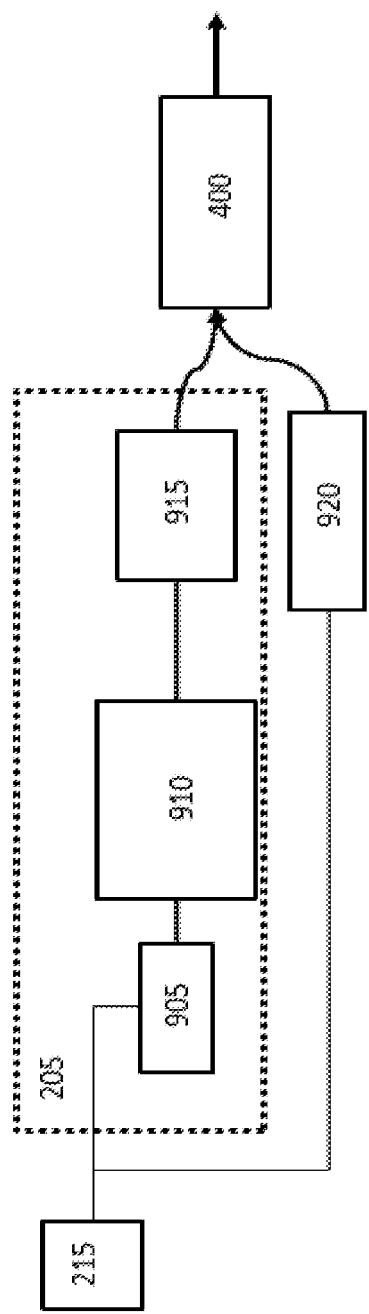
FIG. 9 shows yet another exemplary tuning configuration according to the disclosed embodiments.

FIG. 9 illustrates another tuning method that generally includes a tunable pump laser assembly 205 and an optional seed laser at signal wavelength 920 for narrowing output linewidth of the output signal. The tunable pump laser assembly 205 in this embodiment, comprises a tunable seed laser at pump wavelength 905, a modulator 910, an optical amplifier 915. The tunable pump laser assembly 205 wavelength may be dynamically tuned to change the quasi-phase matching condition in the parallel polished crystal 400. In this embodiment, the seed laser for pump 905 is controlled by the controller 215, but instead of a traditional solid-state laser, such as an Nd:YAG and Nd:YVO4, the seed laser 905 may be advantageously based on a semiconductor laser with a fast tunable phase section and multiple grating sections in order to provide a wide tuning range, for example, a sampled-grating distributed Bragg reflector (SG-DBR) laser. The seed laser for signal 920 may also be based on such fast tunable semiconductor laser. For example, the seed laser for signal may include one or more lasers with ranges tunable from, for example, 1340-1370 nm, 1530-1565 nm, 1565-1625 nm, and 1630-1650 nm. The wavelength of the seed lasers 905 and 920 may be controlled by the controller by applying signals to act on the seed laser gratings and phase section, allowing, for example, nanosecond level tuning from one frequency to another. The output of the pump seed laser 905 may be modulated by the modulator 910, amplified by the optical amplifier 915 and may be input to the parallel polished crystal 400, along with the signal seed laser 920. The tuning range of this configuration may be relatively narrow, for example, ~12 nm signal wavelength and ~50 nm idler wavelength with 10 nm pump tuning, however, the ability to achieve nanosecond level tuning adds additional modes of operation as a spectrometer to finely resolve target species at a narrower scanning range.

The seed laser 920 may have a relatively low power (e.g. 10 mW) and may effectively narrow the output linewidth to ~100 MHz (i.e. 1.3 pm at 2 um). The seeded configuration shown in FIG. 9 may be capable of resolving fine spectral features on the order of approximately 1 nm.

Figure 10:
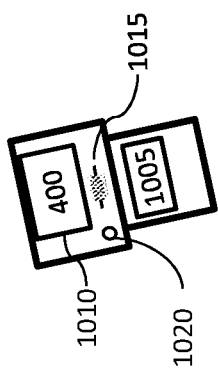
FIG. 10 shows an arrangement for controlling the temperature of the crystal.

As shown in FIG. 10, in one or more embodiments, the temperature of the parallel polished crystal 400 may be controlled to optimize the output wavelength tuning range. A temperature controller 1005 may be used to control the temperature of the crystal 400, for example in the range of 120-150° C. to approximately +/−0.1° C. The crystal 400 may be enclosed in an oven 1010 whose temperature may be controlled by the temperature controller 1005. In some embodiments, a heat source 1015 may be located proximate the crystal 400 and may be controlled by the temperature controller 1005. It should be understood that the temperature controller 1005 may control any suitable device or mechanism for maintaining the crystal 400 at a particular temperature. The controller 215 may issue commands through signal line 345 for setting the temperature of the crystal 400 and for requesting a measured crystal temperature. A sensor 1020 may be mounted proximate the crystal 400 for measuring the temperature of the crystal 310B, and may further provide the measured temperature to the controller 215, for example, in response to the commands from the controller 215.

Figure 11:
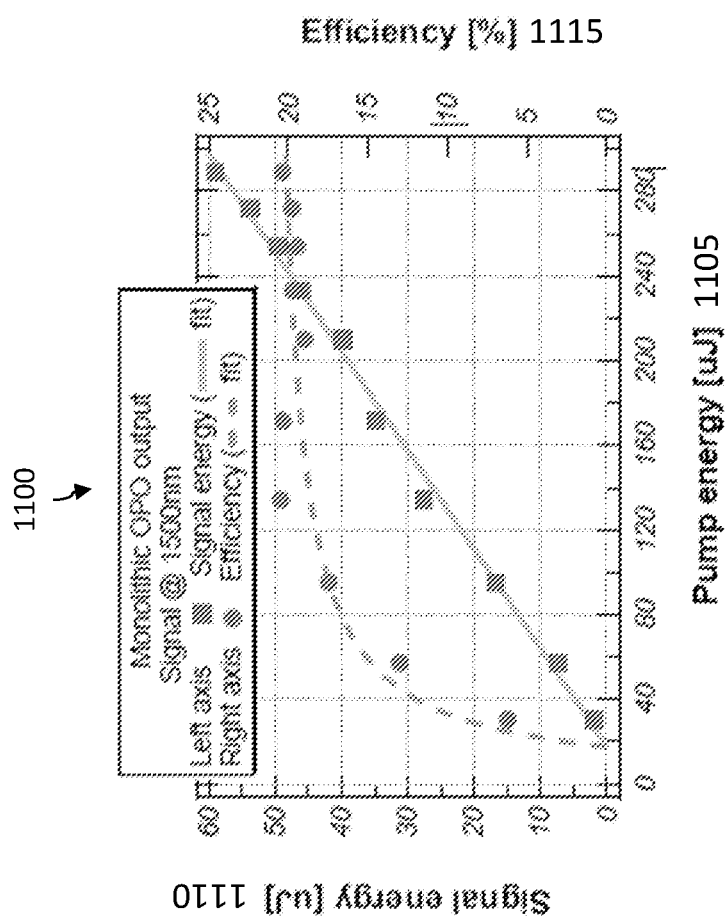
FIGS. 11-13 illustrate exemplary results achieved with the tunable laser assembly used with the parallel polished crystal according to the disclosed embodiments.
Figure 12:
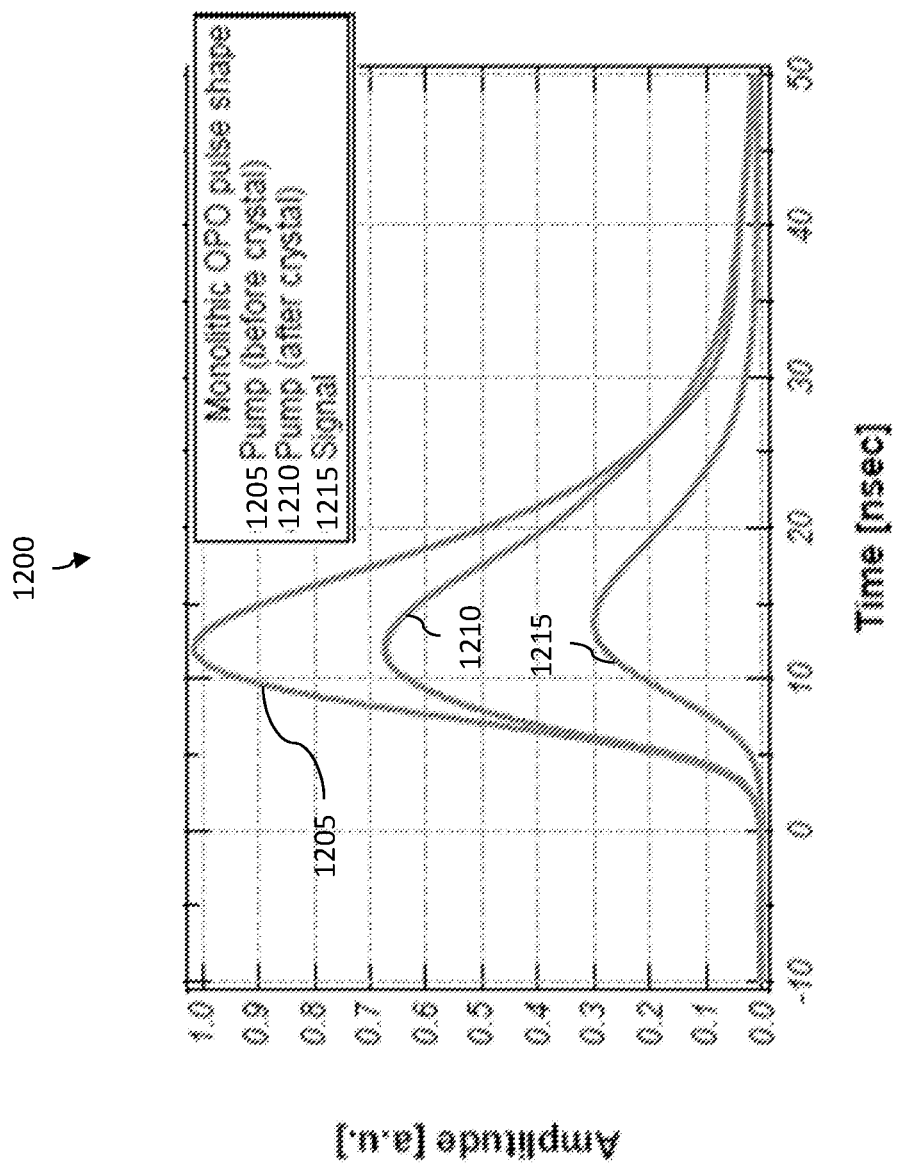
Figure 13:
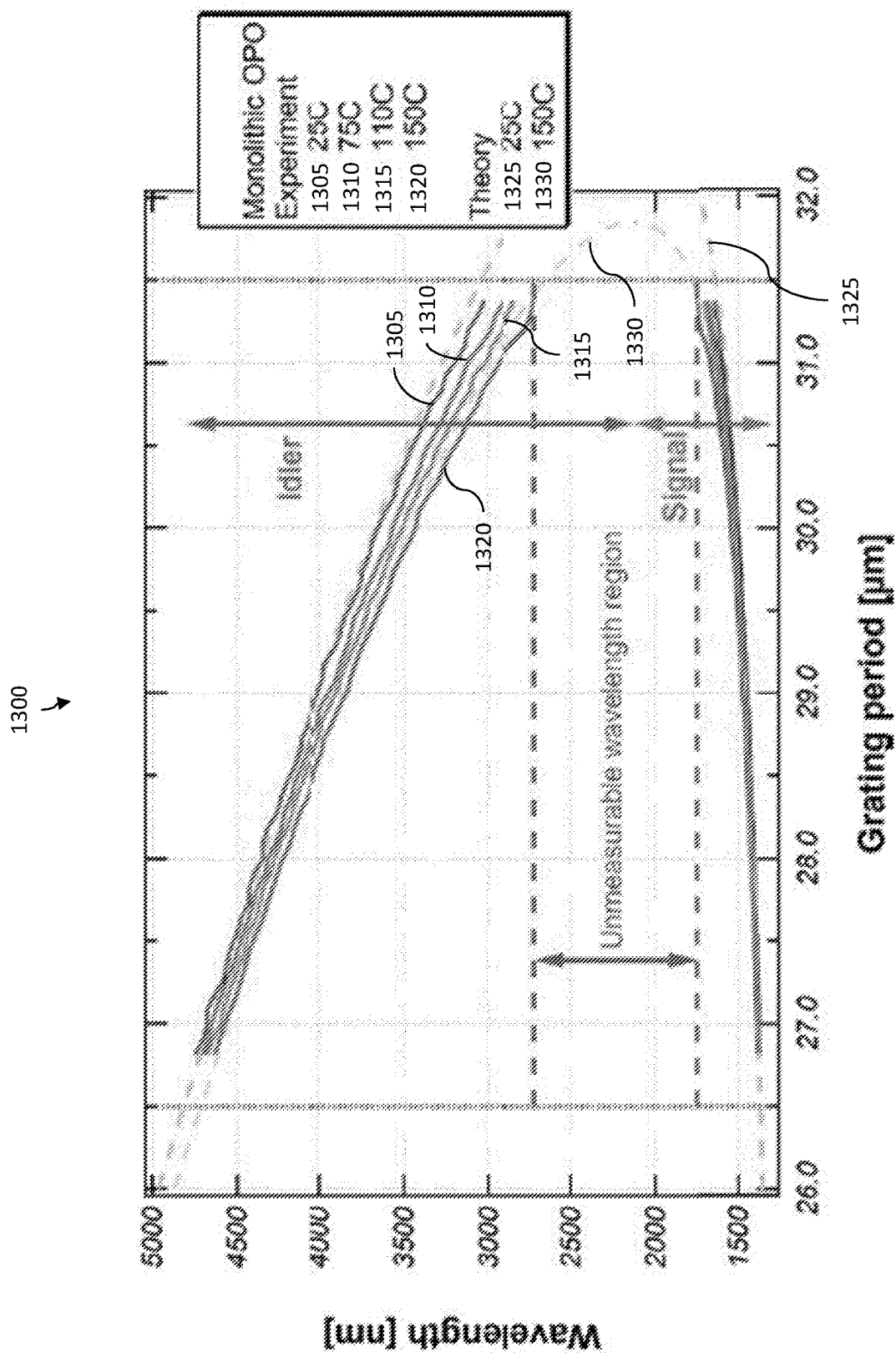

FIGS. 11-13 illustrate exemplary results achieved with the tunable laser assembly 205 used with the parallel polished crystal 400 according to the disclosed embodiments.

FIG. 11 shows a plot 1100 of exemplary results achieved with the tunable laser assembly 205 in combination with the coated parallel polished crystal 400. The plot 1100 shows pump input energy 1105 versus signal output energy 1110, with efficiency 1115 plotted on the right hand axis, for a signal output at 1500 nm. The results demonstrate an efficiency of approximately 20% from the pump input to signal output.

FIG. 12 shows a plot 1200 of exemplary pulse shapes achieved with the tunable laser assembly 205 in combination with the coated parallel polished crystal 400, where plot 1205 shows the pump input signal, plot 1210 shows the pump output signal from the crystal, and plot 1215 shows the signal output.

FIG. 13 shows a plot 1300 of an exemplary tuning range achieved with the tunable laser assembly 205 in combination with an uncoated parallel polished crystal 400, as the crystal held at different temperatures and is moved laterally, resulting in the pump input beam traversing different grating periods. Plot 1305 shows the output when the crystal is held at 25 C, plot 1310 shows the output when the crystal is held at 75 C, plot 1315 shows the output when the crystal is held at 110 C, and plot 1315 shows the output when the crystal is held at 150 C. Plots 1325 and 1330 show theoretical outputs when the crystal is held at 25 C, and 150 C, respectively. The tuning range was somewhat limited due to the uncoated crystal, however, a significantly wide tuning range was achieved, and when using a coated crystal, a wavelength range of from approximately 1300-4700 nm can be achieved.

The disclosed embodiments provide a continuously-tunable spectrum across any target line, for example, between 1.4 and 4.7 m, adding greater flexibility. They may be applied to any LIDAR instrument using the differential spectral absorption technique, and to any planetary bodies including Earth. The embodiments described herein typically utilize a single nonlinear crystal and a single pump laser source, and thus are greatly simplified with respect to the remote spectrometer systems of the prior art. The disclosed embodiments provide an optical parametric oscillator without discrete mirrors, and in addition providing a simpler system with wide tunability, also provide multiple operational modes for various applications. Different tuning methods and linewidth management schemes can be selected, depending on the target applications and species. Compared to previous architectures based on multiple lasers, the disclosed embodiments utilize fewer components, decrease the SWaP of the overall system, provide continuous tuning across the spectrum of the target, enables measurements at tunable wavelengths in the absence of sunlight, and provides seeding options for selecting a desired output linewidth.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A laser spectrometer comprising:
a tunable laser assembly;
a periodically-poled nonlinear optical crystal,
with parallel polished input and output end faces coated to implement optionally one of a doubly-resonant optical parametric oscillator and a triply-resonant optical parametric oscillator whereby the wideband coating on a high refractive index material of MgO:PPLN: magnesium oxide doped, periodically-poled lithium niobate crystal made from a silicon oxide based coating and the input end face has a high transmission T>95%, for the pump beam at approximately 1064 nm, and the idler beam at approximately 2100~4700 nm, and with a high reflection R>90% for the signal beam at approximately 1480~2128 nm, the output end face with a high transmission T>95%, for the pump and idler beams, and a low reflection R for approximately 76% for the signal beam operating as an output coupler,
wherein the periodically-poled nonlinear optical crystal comprises a linearly changing polling period along a width of the periodically-poled nonlinear optical crystal;
wherein and the linearly changing polling period extends from approximately 26.5 μm on a first longitudinal side to approximately 31.5 μm on a second longitudinal side;
and a fan out grating;
a movable mechanism for controlling an entrance location of a pump input beam of the tunable laser on the input end face of the periodically-poled nonlinear optical crystal, such that the pump input beam traverses different grating periods of the periodically-poled nonlinear optical crystal.

2. The laser spectrometer of claim 1, wherein the fan out grating has a fan out of approximately 9 degrees.

3. The laser spectrometer of claim 1, wherein the mechanism comprises a movable stage on which the crystal is mounted.

4. The laser spectrometer of claim 1, wherein the mechanism comprises an optical deflector.

5. The laser spectrometer of claim 4, wherein the optical deflector comprises a potassium tantalate niobate crystal.

6. The laser spectrometer of claim 5, comprising a first power supply coupled to the potassium tantalate niobate crystal for applying an electric field to effect a change in a refractive index of the potassium tantalate niobate crystal.

7. The laser spectrometer of claim 1, comprising a second power supply coupled to the periodically-poled nonlinear optical crystal for applying an electric field to effect a change in a refractive index of the periodically-poled nonlinear optical crystal.

8. The laser spectrometer of claim 1, wherein the tunable laser assembly comprises a seed laser, a pump laser, and an optical amplifier.

9. The laser spectrometer of claim 8, wherein the seed laser comprises a semiconductor laser with a tunable phase section and multiple grating sections.

10. The laser spectrometer of claim 9, wherein the seed laser comprises a sampled-grating distributed Bragg reflector laser.

11. The laser spectrometer of claim 1, comprising a temperature controller for controlling a temperature of the periodically-poled nonlinear optical crystal.

* * * * *